Patented Apr. 18, 1933

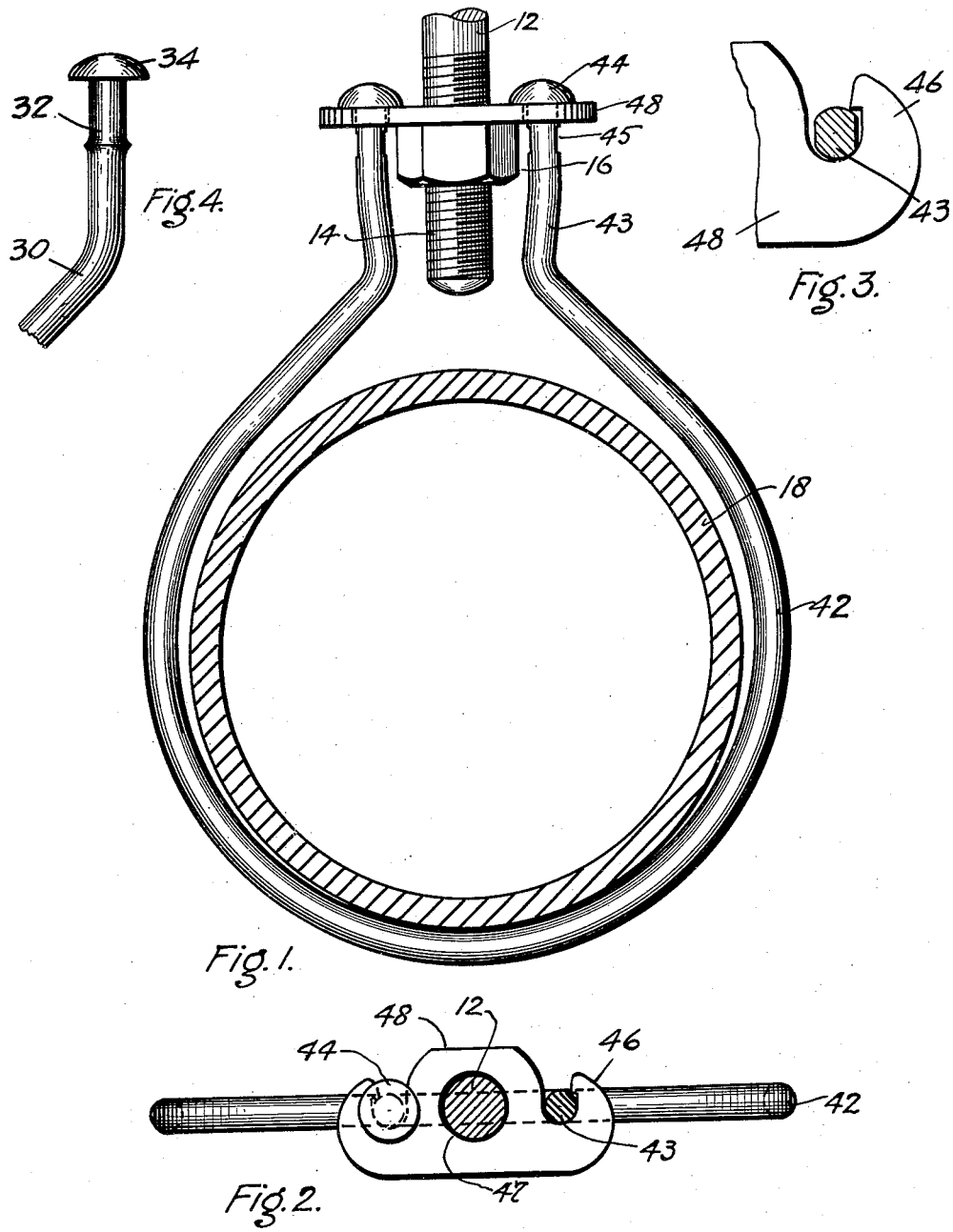

1,904,315

UNITED STATES PATENT OFFICE

PERCY N. KENWAY, OF NEWTON, MASSACHUSETTS

PIPE HANGER

Application filed December 6, 1930. Serial No. 500,520.

This invention relates to pipe hangers for suspending lines of pipe or other apparatus and of the type employing a lag screw or machine bolt. My prior Patent No. 1,017,975 discloses a hanger of that type and in one aspect the present invention consists in an improvement or further development of the construction therein shown with the object of providing a hanger having capacity for a wider range of pipe sizes and one which may be more economically manufactured than that of my earlier invention. In the prior structure, the weight of the pipe line was supported by bent-over ends of a pipe-encircling member. When used with large sizes of pipe, it is difficult and expensive to produce wire bends sufficiently rigid to sustain the weight of the pipe. In the hanger of the present invention, this weakness is overcome by employing a pipe-encircling member with enlarged headed portions upset or swaged from the material thereof to form integral, substantially symmetrical heads disposed to carry the weight of the piping through the medium of circular surfaces disposed adjacent to and substantially symmetrically with respect to the wire and to the line of stress therein.

Preferably and as herein shown, I employ, in combination with the pipe-encircling member of the novel construction above outlined, an improved form of yoke provided with slots having undercut or offset ends retaining the pipe-encircling member by engagement with vertical portions of its ends beneath the upset heads. The slots may be so located as to cause the upset heads to overlie the projected area of the supporting nut or the head of the lag screw, thus causing a direct application of weight and stress thereto.

These and other features of the invention will be best understood and appreciated from the following description of a preferred embodiment thereof, selected for purposes of illustration and shown in the accompanying drawing, in which Fig. 1 is a view in elevation of the hanger, showing the pipe in section; and Fig. 2 is a plan view of the yoke shown in Fig. 1, one side of the pipe-encircling member and supporting lag screw being indicated in section;

Fig. 3 is a fragmentary plan view on an enlarged scale; and

Fig. 4 is a fragmentary view in elevation of a modified form of the end of the pipe-encircling member.

The pipe hanger herein shown includes a yoke 48 which may be stamped or died out from sheet metal, preferably mild steel of suitable thickness. A hole 47 is provided in its central portion and laterally-extending tongues 46 which bound angularly-disposed slots opening through one edge of the yoke. Each tongue has an offset or undercut end which gives to the adjacent slot a restricted opening so that when the pipe-encircling member has been once inserted it is retained in position. It will be observed that the yoke member is a flat piece having plane surfaces and that it may be produced complete by a single stamping or dieing-out operation.

The pipe-encircling or ring member 42 is constructed of heavy wire and has a circular body portion of slightly larger diameter than the pipe 18 which it is to support, being somewhat resilient so that it may be sprung over the pipe when it is not convenient to slip it on from one of the pipe ends. The pipe-encircling member 42 has also two upstanding ends 43 which, as shown in Fig. 1, diverge slightly and are normally spaced apart a distance slightly greater than the spacing of the slots in the yoke 48.

At its upper extremity each end 43 is swaged or upset to form an integral head or button 44 substantially circular in contour and symmetrically disposed with reference to the end. The under face of each head 44 is plane and adapted to rest directly upon the surface of the yoke 48 when the ends of the member 42 are properly entered in the slots of the yoke.

I have shown the ends 43 as provided with oppositely-disposed flats 45 a short distance below the heads 44 for the purpose of facilitating the passage of the ends through the restricted opening of the slots of the yoke, and while this feature of construction is a convenience it is not essential to my invention.

The divergent relation of the ends 43 adapts the pipe-encircling member to be contracted in assembling the hanger in that a cord may be wrapped about the ends 43 to draw them toward each other and this cord will tend to remain in the proper place below the point of engagement with the yoke on account of the characteristic shape of the ends.

As herein shown, the yoke 48 is supported by the nut 16 of a machine bolt 12 threaded at 14 and which, it may be assumed, is suspended in any well-known manner from a ceiling beam. The yoke is free to swivel about the bolt 12 and position itself at right angles to the pipe 18 which is to be supported. As already explained, the ends 43 of the ring member 42 are resiliently locked within the slots of the yoke when they have once been sprung into place so that accidental disengagement of the hanger is avoided even though the pipe line may be swayed in making up its joints.

While I prefer to upset the heads 44 at each end of the wire blank and then form it into the ring member 42, it is convenient in certain sizes of hanger to butt-weld previously swaged ends of the member. Accordingly, in Fig. 4 I have illustrated a portion of a ring member 30 to which has been welded an end 32 having a swaged head 34. The swaged ends may be welded to the ends of the ring member 30 after the latter has been bent into shape or before this operation, according as whichever mode of procedure is most convenient. In welding the end, a circumferential rib may be formed at the point of union and this is useful in holding in place a cord for drawing together the ends of the pipe-encircling member where this is necessary.

It will be noted that in assembling the pipe hanger the heads 34 or 44 may project partially over the nut 16 of the machine bolt or over the lag screw head which occupies a similar relation.

Having thus described my invention, what I claim as new and desire to secure by Letters Patent is:

1. A pipe hanger for use with a lag screw or the like, comprising a flat yoke of sheet metal constructed and arranged to be supported by the head of a lag screw and to swivel about the shank thereof, together with a pipe-encircling member constructed of a continuous length of wire of uniform circular cross-section and having normally divergent sides with integral, upset, concentric headed portions at the ends thereof, the said yoke being provided with slots having restricted openings which are accessible from the external edge of the yoke and adapted to receive the sides of said encircling member when forced temporarily together and to engage beneath the headed portions, retaining them in place, the outside perimeter of said headed portions extending partially above the underlying lag screw head.

2. A pipe hanger for use with a lag screw or machine bolt, comprising a flat sheet metal yoke arranged to swivel upon the screw or bolt and having laterally extending slots with restricted openings near its ends which are accessible from the external edge of the yoke, and a pipe-encircling member of heavy wire having upstanding ends yieldingly spaced apart a distance greater than the distance between the slots and adapted to be sprung into said slots, said upstanding ends being swaged into heads subtantially circular in contour and symmetrically disposed with respect to the line of stress in said upstanding ends.

PERCY N. KENWAY.